(12) United States Patent
Smart

(10) Patent No.: US 12,449,261 B2
(45) Date of Patent: Oct. 21, 2025

(54) SYSTEM FOR ORGANIZING AND DIRECTING PEOPLE FROM A FIRST LOCATION TO A SECOND LOCATION

(71) Applicant: Geordy Joseph Smart, Langley (CA)

(72) Inventor: Geordy Joseph Smart, Langley (CA)

(73) Assignee: Geordy Joseph Smart, Langley (CO)

( * ) Notice: Subject to any disclaimer, the term of this patent is extended or adjusted under 35 U.S.C. 154(b) by 356 days.

(21) Appl. No.: 18/144,935

(22) Filed: May 9, 2023

(65) Prior Publication Data

US 2024/0377202 A1    Nov. 14, 2024

(51) Int. Cl.
  G01C 21/20    (2006.01)
  G01C 21/00    (2006.01)

(52) U.S. Cl.
  CPC ......... G01C 21/206 (2013.01); G01C 21/383 (2020.08)

(58) Field of Classification Search
  CPC ...... G06N 3/063; G06N 5/047; G06T 19/006; G06T 19/20; G06T 2207/10028; G06T 17/00; G06T 19/00; G06T 15/20; G06T 7/70; G06T 2207/10016; G06T 7/55; G06T 5/50
  See application file for complete search history.

(56) References Cited

U.S. PATENT DOCUMENTS

| | | | |
|---|---|---|---|
| 6,912,293 B1 * | 6/2005 | Korobkin | G06T 15/20 382/284 |
| 8,534,216 B2 | 9/2013 | Wallace | |
| 8,618,909 B1 | 12/2013 | Clausen | |
| 2002/0136449 A1 * | 9/2002 | Park | G06V 10/56 382/164 |
| 2004/0041822 A1 * | 3/2004 | Lizuka | G06T 19/006 348/E5.022 |
| 2004/0155877 A1 * | 8/2004 | Hong | G06T 7/11 345/419 |
| 2006/0206353 A1 | 9/2006 | Buschi et al. | |
| 2006/0278764 A1 | 12/2006 | Zhao | |

(Continued)

FOREIGN PATENT DOCUMENTS

| | | |
|---|---|---|
| CN | 110282141 A | 9/2019 |
| JP | 2000298736 A | 10/2000 |

(Continued)

*Primary Examiner* — Khalid W Shaheed

(74) *Attorney, Agent, or Firm* — Argus Intellectual Enterprise, LLC; Jordan Sworen; Daniel Enea

(57) ABSTRACT

A system for organizing and directing people from a first location to a second location is provided. The system includes a database operably connected to a projector that is mounted to an overhead location at the first location. The projector is easily moved and can display an image on the floor surface of the first location, which includes a marking indicating the desired arrangement of the second location. An interface is operably connected to the database, which automatically updates the arrangement to a second arrangement based on a plurality of input criteria, such as a predetermined time interval, motion sensor detection, change in seating arrangement, overcrowding or high traffic areas, changes to the second location, and the like. The database can be updated in real time to allow the system to selectively direct a flow of people to the second location.

20 Claims, 4 Drawing Sheets

(56) References Cited

U.S. PATENT DOCUMENTS

| | | | | |
|---|---|---|---|---|
| 2012/0188233 | A1* | 7/2012 | Shuster | G06T 15/20 345/419 |
| 2016/0039539 | A1 | 2/2016 | Cawley | |
| 2022/0242588 | A1 | 8/2022 | Watson et al. | |

FOREIGN PATENT DOCUMENTS

| | | | |
|---|---|---|---|
| JP | 2014191698 A | 10/2014 | |
| WO | 2018223201 A1 | 12/2018 | |

\* cited by examiner

SYSTEM FOR ORGANIZING AND DIRECTING PEOPLE FROM A FIRST LOCATION TO A SECOND LOCATION

BACKGROUND OF THE INVENTION

The present invention relates to a system for organizing and directing people. More specifically, the present invention relates to a system for organizing and directing people from a first location to a second location, wherein the system is configured to be easily transported and can receive real-time input based on changing criteria.

The process of boarding a plane can often be a time-consuming and frustrating experience for passengers, causing delays and reducing customer satisfaction. Existing systems for boarding planes typically involve passengers boarding the plane in a first-come, first-served manner or boarding by seat row numbers. However, these methods often result in long waiting times for passengers as they struggle to find space for their carry-on luggage, stow their bags and settle into their assigned seats.

Moreover, the rush of passengers trying to get on the plane as quickly as possible can cause bottlenecks at the gate, further adding to the delays. This often results in poor customer experience, and airlines may even lose potential profits by not being able to maximize the use of their planes due to longer turnaround times.

Some known art exists that integrates or utilizes secondary signage or permanent markings on a surface to form lines for boarding passengers. However, these props and markings are not easily moved or modifiable. Additionally, human intervention is required to reorganize passengers within this pre-boarding zone if any seating changes occur.

The current invention overcomes these deficiencies by introducing a new system of boarding that organizes passengers and projects the seating plan of the plane, allowing each passenger to stand in their assigned seating plan and have their ticket scanned in the same order. This method allows the plane to be loaded back to front, reducing waiting times and eliminating bottlenecks at the gate. Furthermore, this system can be implemented in other commercial areas that receive high amounts of foot traffic to assist with organizing and directing people in the most efficient manner.

In light of the devices disclosed in the known art, it is submitted that the present invention substantially diverges in design elements and methods from the known art and consequently it is clear that there is a need in the art for an improvement for a system for organizing and directing people from a first location to a second location. In this regard the instant invention substantially fulfills these needs.

SUMMARY OF THE INVENTION

In view of the foregoing disadvantages inherent in the known types of systems for organizing and directing people from a first location to a second location now present in the known art. The present invention provides a new system for organizing and directing people from a first location to a second location, wherein the same can be easily transported and updated.

It is an objective of the present invention to provide an embodiment of the system for organizing and directing people from a first location to a second location comprising a database operably connected to a projector, wherein the projector is configured to mount to an overhead location at the first location. The projector is configured to display an image on a floor surface of the first location, wherein the image indicates a desired arrangement or organization of people. An interface is operably connected to the database, wherein the interface is configured to automatically update the desired arrangement to a second desired arrangement based on a plurality of input criteria.

It is another objective of the present invention to provide an embodiment of the system for organizing and directing people from a first location to a second location wherein the system offers a streamlined and efficient solution for directing people from one location to another. The ability to automatically update the desired arrangement based on input criteria ensures that the system remains flexible and adaptable to changing needs. The projector's ability to display the image on the floor surface provides clear and visible guidance to individuals, ensuring a smooth and efficient flow of people to the intended location.

It is yet another objective of the present invention to provide a system that enhances the overall efficiency and effectiveness of directing people in various contexts, including but not limited to airports, museums, and other public spaces. The system's ability to direct a flow of people to a specific location offers a streamlined and efficient solution to directing individuals in crowded or complex environments.

It is yet another objective of the present invention to provide a system that enhances the overall efficiency and effectiveness of directing people in various contexts, including but not limited to airports, museums, and other public spaces. The system's ability to direct a flow of people to a specific location offers a streamlined and efficient solution to directing individuals in crowded or complex environments.

It is therefore an object of the present invention to provide a new and improved system for organizing and directing people from a first location to a second location that has all of the advantages of the known art and none of the disadvantages.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
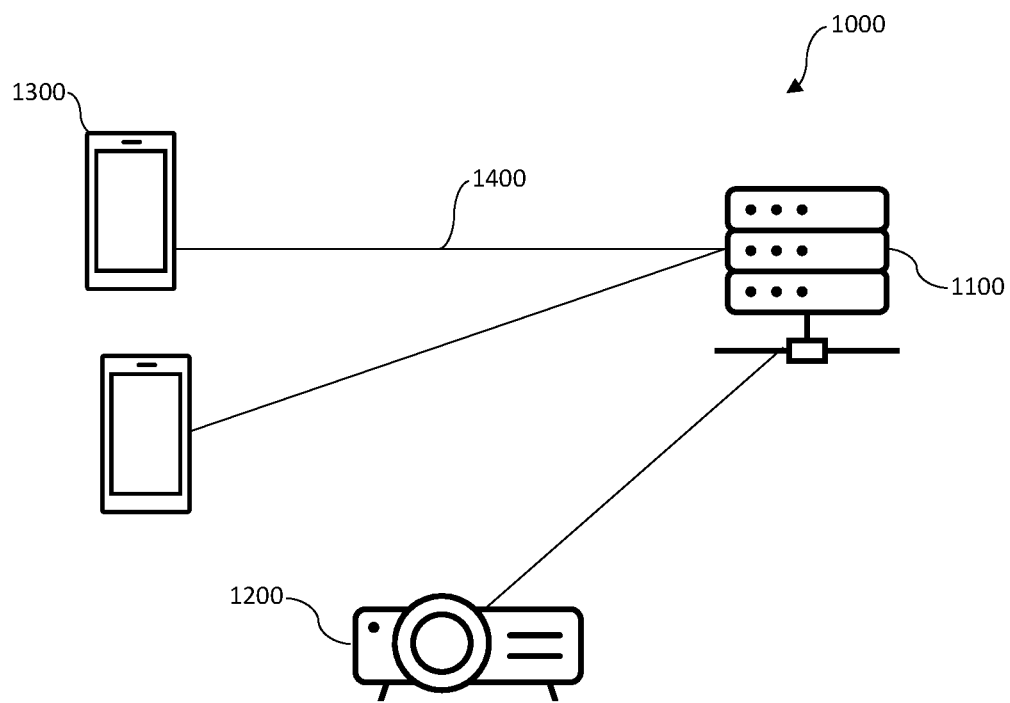
FIG. 1 shows a schematic view of an embodiment of the system for organizing and directing people from a first location to a second location.

Reference is made herein to the attached drawings. Like reference numerals are used throughout the drawings to depict like or similar elements of the system. For the purposes of presenting a brief and clear description of the present invention, the preferred embodiment will be discussed as used for organizing and directing people from a first location to a second location, wherein the system is configured to be easily transported and can receive real-time input based on changing criteria. The figures are intended for representative purposes only and should not be considered to be limiting in any respect. Furthermore, the described features, structures, or characteristics may be combined in any suitable manner in one or more embodiments. In the following description, numerous specific details are provided to give a thorough understanding of embodiments.

Reference will now be made in detail to the exemplary embodiment(s) of the invention. References to "one embodiment," "at least one embodiment," "an embodiment," "one example," "an example," "for example," and so on indicate that the embodiment(s) or example(s) may include a feature, structure, characteristic, property, element, or limitation but that not every embodiment or example necessarily includes that feature, structure, characteristic, property, element, or limitation. Further, repeated use of the phrase "in an embodiment," "first embodiment", "second embodiment", or "third embodiment" does not necessarily refer to the same embodiment.

Figure 2:
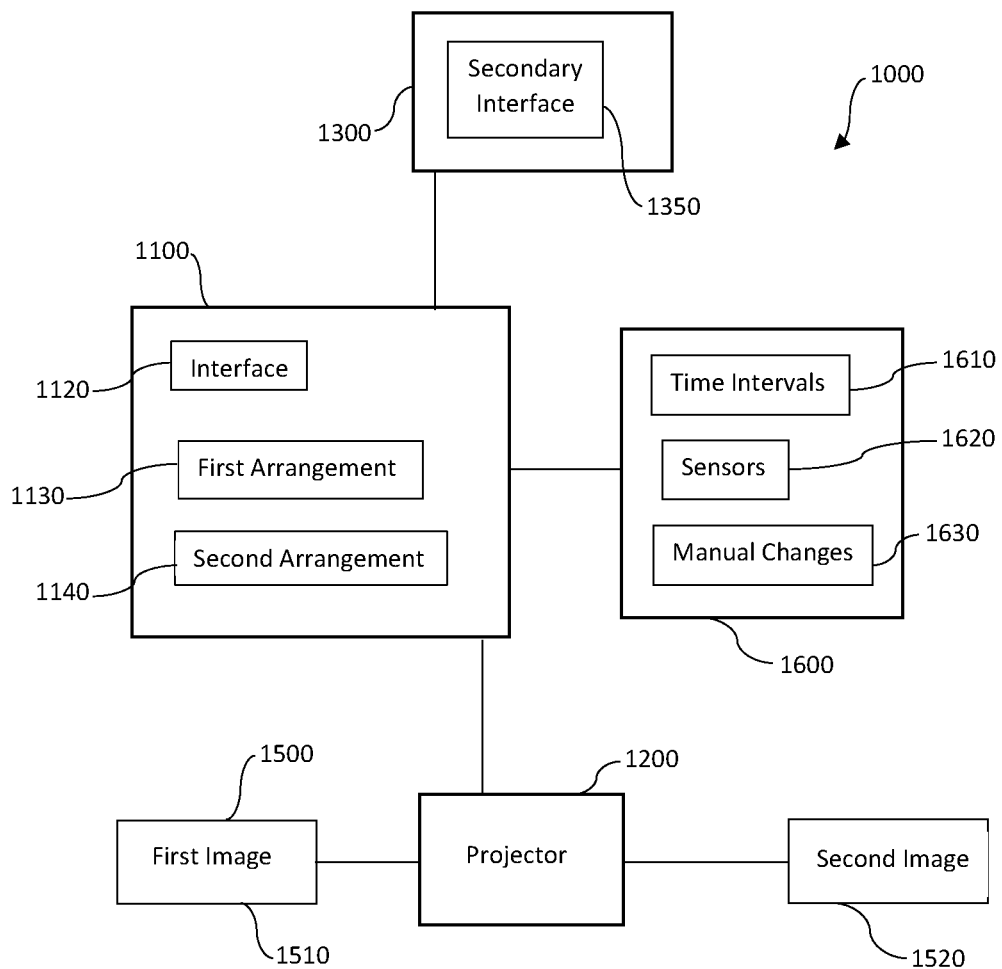
FIG. 2 shows a block diagram of an embodiment of the system for organizing and directing people from a first location to a second location.

Referring now to FIGS. 1 and 2, there is shown a schematic view and a block diagram of an embodiment of the system for organizing and directing people from a first location to a second location, respectively. The system 1000 comprises an electronic device having a database 1100 stored thereon, wherein the database 1100 is configured to store and receive information. In the illustrated embodiment, the electronic device can be a mobile electronic device, a computer or any other suitable electronic device configured to store and receive information via a wireless connection 1400 or a wired connection. In some embodiments, the database 1100 is operably connected with an interface 1120, such as a display having a user interface, directly thereon for receiving information. In alternate embodiments, a separate electronic device 1300 comprises a user interface 1350 for sending information to the database. In the illustrated embodiment, the database 1100 is configured to receive information from a plurality of distinct electronic devices 1300, such as smart devices.

The information contained within the database 1100 is configured to be sent to a projector 1200 operably connected to the database 1100. In the illustrated embodiment, the projector 1200 is wirelessly connected to the database and configured to receive real-time information as the database receives the information. In some embodiments, the projector 1200 is configured to mount overhead at a first location and project an image 1500 on a floor surface of the first location. For example, the projector is mountable to a ceiling or vertical support, wherein the first location is any location that benefits from organizing people in a particular order prior to a person or group of people migrate to a second location, such as an airport, restaurant, museum, sports stadium, music hall, commercial shopping centers, movie theaters, and the like. In alternate embodiments, the projector is configured to mount or be disposed in any suitable position to illuminate a floor surface. For example, the projector can be placed on a floor surface to project an image onto the floor.

In the illustrated embodiment, the projector 1200 is light weight and portable, such that the projector can be readily moved by an individual person if needed. For example, if there is a problem that occurs at the first location, such as an overcrowding of people not intended to traverse to the second location, a construction issue at the first location, a safety concern, etc, the projector can be readily moved to a new or different first location and remain connected to the same electronic device comprising the database, or connect to a different electronic device having access to the database. In the illustrated embodiment, the projector 1200 is a digital projector, such as a liquid-crystal-display (LCD) projector, a digital light processing (DLP) projector, and a laser projector. In some embodiments, the image displayed is a three-dimensional image, that allows a person to better visualize their placement within the projected image amongst a group of people and various terrain, as well as better visualize directions indicated via the projected image.

The database 1100 is configured to receive a plurality of arrangements, wherein each arrangement comprises a particular configuration in which a group of people are organized according to a seating plan in a second location and plans for directing each person or group from the first location to the second location. The second location is related to the first location in that the first location is a waiting area or a loading area where people congregate or pass through to traverse to the second location. People can traverse between the first and second location via foot or within a vehicle, depending on the distance between the first and second locations. In alternate embodiments, the organization is not just of people, but vehicles used to transport people from the first location to the second location, such as on a ferry.

In the illustrated embodiment, the database 1100 stores a first arrangement 1130 and a second arrangement 1140 that are sent to the projector 1200 to be projected as an image 1500 on a surface. In the illustrated embodiment, the image 1510 of the first arrangement 1130 is configured to be displayed prior to displaying the image 1520 of the second arrangement 1140. The first arrangement 1130 comprises an initial desired arrangement with an indicator that directs a first group towards the second location. A group in this instance can also refer to an individual, wherein a group refers one or more individuals configured to be directed simultaneously as prompted by the image projected or otherwise instructed. The second arrangement comprises a different configuration than the first image 1510, wherein the indicator is displayed in a different position to direct a second group of people towards the second location.

In some embodiments, the projector is configured to automatically receive the second arrangement from the database 1100 according to input criteria 1600 received by the database. Once the input criteria is satisfied after displaying the first arrangement, the database 1100 will signal the projector to display the second arrangement. Once the input criteria is satisfied after displaying the second arrangement, the database 1100 will signal the projector to display a third arrangement, and so on and so forth until all the groups are relocated from the first location to the second location. For example, in some embodiments, a predetermined time interval 1610 is set to instruct the database to send the second arrangement to the projector 1200 when a particular amount of time has lapsed. It can be determined that 30 seconds is needed between a projection of each arrangement to allow sufficient time to pass for the first group to traverse from the first location to the second location.

In some embodiments, the input criteria is received from a sensor, such as a proximity sensor, a motion sensor, and weight sensor, and the like. For example, a weight sensor can be disposed within the seating of the second location and once it is detected that a predetermined percentage of the first group has been seated, a signal will be sent instructing the database to send the second arrangement to the projector 1200. Alternatively, a motion sensor can be disposed between the first and second location and when the first group is detected to pass the sensor, a signal will be sent instructing the database to send the second arrangement to the projector 1200.

In alternate embodiments, the input criteria is manual and allows a user to independently determine and signal the database to send the second arrangement to the projector 1200. In some embodiments, the system 1000 comprises multiple input criteria that is capable of instructing the database to send the second arrangement to the projector 1200.

In alternate embodiments, the second arrangement can be a completely new configuration of according to changes made to seating plans within the first arrangement. This allows for real-time modification of the arrangements if a group is changed in position or completely eliminated from the arrangement, or if the entire configuration changes, such as a new venue or airplane is being used and comprises a different number of seats and the position of seats are different.

Figure 3:
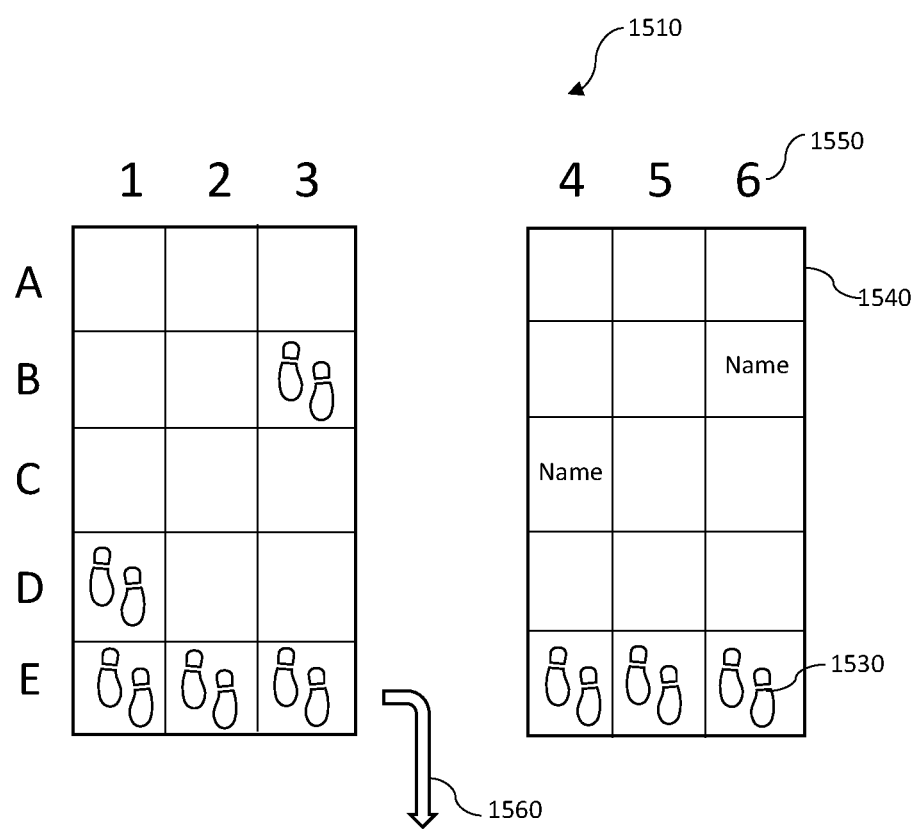
FIG. 3 shows a planar view of an image of a first arrangement of an embodiment of the system for organizing and directing people from a first location to a second location.
Figure 4:
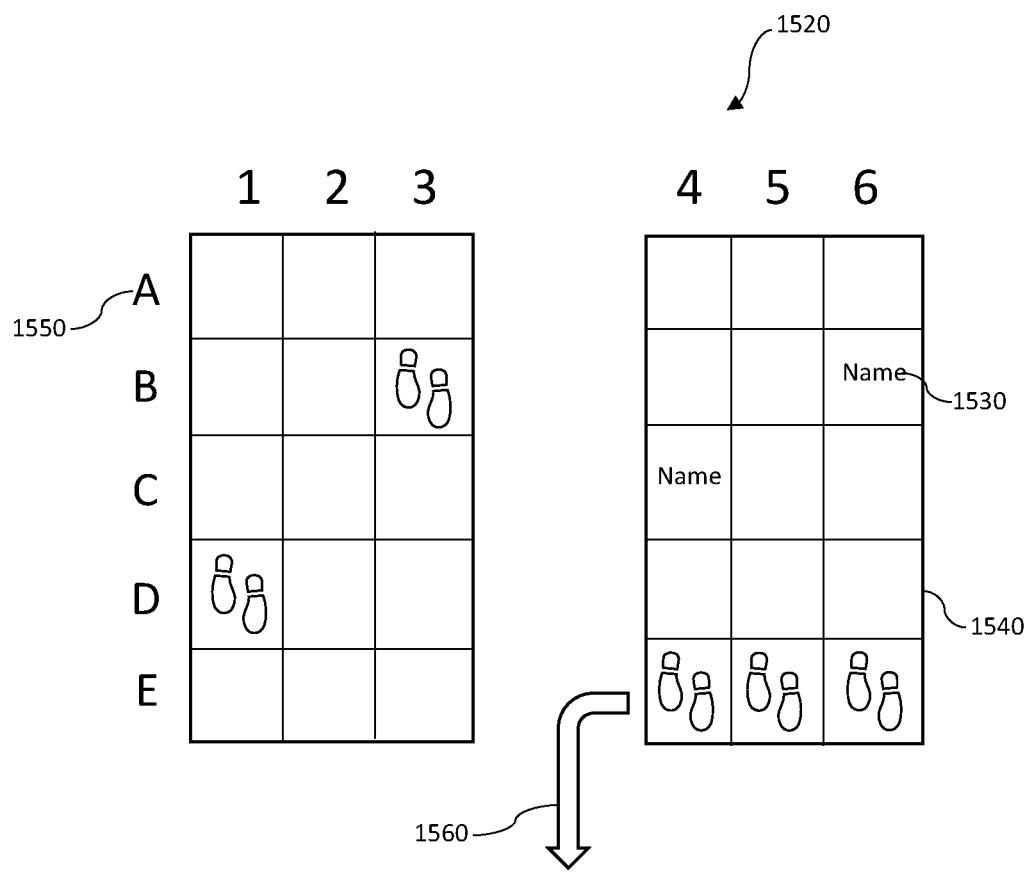
FIG. 4 shows a planar view of an image of a second arrangement of an embodiment of the system for organizing and directing people from a first location to a second location.

Referring now to FIGS. 3 and 4, there are shown planar views of an image of a first arrangement and a second arrangement of an embodiment the system for organizing and directing people from a first location to a second location, respectively. In FIG. 3 of the illustrated embodiment, the first image 1510 indicates a first arrangement showing a plurality of markings 1530 that indicate to an individual where to stand. The markings 1530 are any suitable icon or wording, such as a ticket holder name, footprints, a number assigned to a particular seat or ticket holder, a color, and the like. In some embodiments, the markings 1530 are outlined by a plurality of boundary lines 1540 to indicate the space or area provided to a particular person or group. In the illustrated embodiment, the boundary lines are disposed in a grid pattern providing each group an equal spaced area to stand. However, in alternate embodiments, the boundary lines can be configured in any suitable manner according to a desired arrangement. In the illustrated embodiment, the images also comprise a queue system comprising labels to indicate a particular zone, row, column, or the like to further assist with the organization of the group and to indicate to a person how to locate their marking 1530.

The indicator 1560 in the shown embodiment is an arrow extending from a row and pointing in the direction in which the group is to travel to get to the second location. In some embodiments, each image comprises a plurality of indicators extending from the first location to the second location, providing direction to each group traversing the locations. The indicator 1560 position changes between the first and second image to indicate to the next group when it is their turn to move from the first location. Additionally, the markings 1530 that were associated with the first group shown in the first image are removed from the second image to further direct and indicate to the first group that their movement between locations has already occurred or been approved by the system.

The current invention proposes a new system for boarding planes and filling seating that solves the deficiencies of existing systems. By arranging ticket holders into projected seating or standing positions of the second location, each ticket holder can stand in their assigned seat and have their ticket scanned in the same order, allowing the plane to be loaded back to front or another systematic manner of filling any type of stadium seating. This system reduces waiting times and eliminates bottlenecks at the gate or other waiting areas, improving the overall customer experience. In the illustrated embodiment, the system only requires an electronic device having a database with seating arrangements disposed thereon and a projector mounted on the ceiling or appropriate rigging.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A system for organizing and directing people from a first location to a second location, comprising:
   a database stored on an electronic device and operably connected to a projector, wherein the projector is configured to mount to an overhead location at the first location;
   wherein the projector is configured to display a first image and a second image of the first location, wherein the first mage indicates a first arrangement of the second location and the second image indicates a second arrangement of the second location;
   an interface operably connected to the database, wherein the interface 1s configured to update the first image and second image based on a plurality of input criteria;
   wherein the first arrangement and the second arrangement each comprise a particular configuration in which a group are organized according to the particular configuration in the second location;
   wherein the first arrangement and the second arrangement each comprise an indicator for directing the group from the first location to the second location;
   wherein the database having logic, that when executed by a processor causes the following; receiving the first arrangement; projecting the first image of the first arrangement on a floor surface of the first location; receiving one or more input criteria from the plurality of input criteria; projecting the second image of the second arrangement; directing the group to the second location.

2. The system of claim 1, wherein the projector and database are readily moved and portable.

3. The system of claim 1, wherein the first arrangement and second arrangement each comprise an airplane seating arrangement and the group comprises a group of individual single ticket holders.

4. The system of claim 1, wherein the first image and the second image each comprise a marking to indicate to the group a standing position on the first image or the second image.

5. The system of claim 4, wherein the marking is a name of the group.

6. The system of claim 4, wherein the marking comprises a boundary line disposed entirely therearound to indicate a boundary for the group associated with the marking.

7. The system of claim 6, further comprising a queue system having a plurality of labels, wherein at least one label is associated with a plurality of markings and disposed exterior to the boundary line.

8. The system of claim 4, wherein the indicator position on the first image is different from the indicator position on the second image.

9. The system of claim 1, wherein the database is stored on a mobile electronic device configured to store and receive information via a wireless connection.

10. The system of claim 1, wherein the projector is operably connected to the database and configured to receive real-time information as the database receives the information.

11. The system of claim 1, wherein the second location is related to the first location in that the group is required to pass through the first location to enter the second location.

12. The system of claim 1, wherein the projector is configured to automatically receive the second arrangement from the database according to the input criteria received by the database.

13. The system of claim 12, wherein the input criteria is received from a sensor.

14. The system of claim 12, wherein the plurality of input criteria comprises location, time, and date.

15. The system of claim 13, wherein the sensor is a weight sensor disposed within at the second location and once a pre-determined weight is detected by the weight sensor, a signal will be sent to the database.

16. The system of claim 13, wherein the sensor is a motion sensor disposed between the first location and the second location such that when a first group is detected to pass the motion sensor, a signal is sent to the database.

17. The system of claim 1, wherein the input criteria is manually entered to allow a user to independently signal the database to send the second arrangement to the projector.

18. The system of claim 1, wherein the database is configured to receive information from a plurality of distinct electronic devices.

19. The system of claim 1, wherein the projector is configured to project a different indicator for each arrangement to direct each group from the first location to the second location.

20. The system of claim 1, wherein the projector is mounted to display the first image and the second image on the floor surface.

\* \* \* \* \*